(12) United States Patent
Siefert

(10) Patent No.: US 11,959,746 B2
(45) Date of Patent: Apr. 16, 2024

(54) ACTIVE CENTERING CONTROL OF A GYROSCOPE

(71) Applicant: WaveTamer LLC, Greenville, NC (US)

(72) Inventor: Andrew K. Siefert, Ypsilanti, MI (US)

(73) Assignee: WAVETAMER LLC, Greenville, NC (US)

( * ) Notice: Subject to any disclaimer, the term of this patent is extended or adjusted under 35 U.S.C. 154(b) by 141 days.

(21) Appl. No.: 17/591,222

(22) Filed: Feb. 2, 2022

(65) Prior Publication Data

US 2023/0273023 A1 Aug. 31, 2023

(51) Int. Cl.
*G01C 19/04* (2006.01)
*B63B 79/10* (2020.01)

(52) U.S. Cl.
CPC .............. *G01C 19/04* (2013.01); *B63B 79/10* (2020.01)

(58) Field of Classification Search
CPC ......... G01C 19/04; B63B 79/10; B63B 39/04; B62D 37/06
See application file for complete search history.

(56) References Cited

U.S. PATENT DOCUMENTS

| | | | |
|---|---|---|---|
| 1,617,309 A | 2/1927 | Schein | |
| 3,987,555 A * | 10/1976 | Haagens | G01C 19/28 33/324 |
| 4,030,371 A * | 6/1977 | Bulman | G01C 19/22 74/5 F |
| 4,161,889 A * | 7/1979 | Hinds | F02G 1/0435 74/64 |
| 4,180,916 A * | 1/1980 | Brook | G01C 19/38 74/5.34 |
| 4,193,308 A | 3/1980 | Stuhler et al. | |
| 4,275,604 A * | 6/1981 | Derossi | G01C 19/38 33/324 |
| 4,295,381 A * | 10/1981 | Hinds | G01C 19/30 74/5.22 |
| 4,361,055 A * | 11/1982 | Kinson | F16H 33/10 74/5.22 |
| 2005/0274210 A1 | 12/2005 | Adams et al. | |
| 2007/0162217 A1* | 7/2007 | Selbe | B63B 39/04 701/116 |

(Continued)

OTHER PUBLICATIONS

Han et al., "Performance of an active electric bearing for rotary micromotors", Article in Journal of Micromechanics and Microengineering, Jul. 2011, (http://iopscience.iop.org/0960-1317/21/8/085027).

*Primary Examiner* — Tung S Lau
(74) *Attorney, Agent, or Firm* — COATS & BENNETT, PLLC

(57) ABSTRACT

A controller controls precession of a gyroscope that oscillates about a precession axis perpendicular to a spin axis and a roll axis of the gyroscope. To do so, the controller detects a deviation of a center of the oscillation away from a nominal center. The precession is caused by roll of the gyroscope about the roll axis and imposes decreasing amounts of damping upon the roll as the precession moves away from the nominal center. The controller reduces the deviation of the center of the oscillation by applying an asymmetric amount of braking to the precession when the precession and the deviation are in a same direction relative to when the precession and the deviation are in opposing directions.

14 Claims, 16 Drawing Sheets

(56) References Cited

U.S. PATENT DOCUMENTS

2008/0079237 A1  4/2008  Rubin
2018/0094947 A1  4/2018  Debanne et al.
2020/0317308 A1  10/2020  Peterson

* cited by examiner

CALIBRATION DATA 108

- PRECESSION ANGLE THRESHOLD ($PA_{TH}$) 311
- PRECESSION DAMPING INCREMENT GAIN ($GAIN_{D+}$) 312
- PRECESSION DAMPING DECREMENT GAIN ($GAIN_{D-}$) 313
- HYDRAULIC SYSTEM DIMENSION(S) (DIM) 314
- DAMPING CORRECTION PID GAIN(S) ($GAIN_{COR}$) 315
- PRECESSION CENTERING GAIN ($GAIN_C$) 316
- FLYWHEEL MASS MOMENT OF INERTIA (MOI) 317
- PRECESSION CONTROL PID GAIN(S) ($GAIN_{PCON}$) 318
- GYRO MASS PROPERTIES (MASS) 319
- ANTI-ROLL TORQUE INCREMENT GAIN ($GAIN_{AR+}$) 321
- ANTI-ROLL TORQUE DECREMENT GAIN ($GAIN_{AR-}$) 322

FIG. 13

SENSORS 104

- OIL TEMP SENSOR 301
- OIL PRESSURE SENSOR 302
- ROLL SENSOR 303
- FLYWHEEL ANG VEL SENSOR 304
- GYRO PRECESSION ANGLE SENSOR 305
- CURRENT SENSOR 306

FIG. 12

400

DETECTING A DEVIATION OF A CENTER OF THE OSCILLATION AWAY FROM A NOMINAL CENTER, WHEREIN THE PRECESSION IS CAUSED BY ROLL OF THE GYROSCOPE ABOUT THE ROLL AXIS AND IMPOSES DECREASING AMOUNTS OF DAMPING UPON THE ROLL AS THE PRECESSION MOVES AWAY FROM THE NOMINAL CENTER
410

REDUCING THE DEVIATION OF THE CENTER OF THE OSCILLATION BY APPLYING AN ASYMMETRIC AMOUNT OF BRAKING TO THE PRECESSION WHEN THE PRECESSION AND THE DEVIATION ARE IN A SAME DIRECTION RELATIVE TO WHEN THE PRECESSION AND THE DEVIATION ARE IN OPPOSING DIRECTIONS
420

FIG. 16

ACTIVE CENTERING CONTROL OF A GYROSCOPE

TECHNICAL FIELD

The present disclosure generally relates to the use of computing systems to actively control the motion of a spinning gyroscope and, more particularly, to control the precession of a gyroscope to improve the efficiency of its anti-roll effects.

BACKGROUND

Gyroscopes demonstrate certain physical properties that have historically made them quite useful in a wide variety of technical settings. A traditional gyroscope as is known in the prior art is illustrated in FIG. 1.

Traditionally, a gyroscope 10 comprises a spinning body (e.g., a flywheel 40) that rotates around a spin axis 50. The example flywheel 40 of FIG. 1 is mounted into three gimbals 20a, 20b, 20c, each of which allows the flywheel 40 to pivot about an axis that is perpendicular to the others. When three gimbals 20 are used (as in FIG. 1), the flywheel 40 is provided with three degrees of axial freedom such that the orientation of the flywheel 40 and its spin axis 50 are independent of its mount 30.

The spinning flywheel 40 has an angular momentum that is perpendicular to the plane in which it spins. If the flywheel 40 spins clockwise as viewed from the top, the angular momentum is downward. If the flywheel 40 spins counterclockwise as viewed from the top, the angular momentum is upward. In either case, if the angular momentum is in alignment with the sum of the external forces acting on the gyroscope 10 (e.g., gravity), the spin axis 50 will remain vertical and stationary.

When the gyroscope 10 is mounted such that movement of the spin axis 50 is not restricted, the orientation of the spin axis 50 is generally not impacted when the mount 30 is tilted. In general, the larger the mass and/or spin rate of the flywheel 40, the greater the stability of the spin axis 50.

The difference between the orientation of the mount 30 as compared to the spin axis 50 may be used for a variety of technical purposes. For example, the orientation of the spin axis 50 as compared to the orientation of the mount 30 may be used in an instrument to indicate the orientation of a platform or vehicle to which the gyroscope 10 is mounted. In one particular example, a gyroscope 10 may be useful to indicate the amount of roll occurring to an aircraft. This may be particularly useful to a pilot who is unable to observe this roll through their natural senses, e.g., because visibility of the horizon is obscured by weather.

When an external torque is applied to the gyroscope 10, a phenomenon known as precession occurs. Precession is a movement of the spin axis 50 resulting from the application of external torque that moves the spin axis 50. This external torque may be, for example, due to gravity acting on the center of mass of the gyroscope after the gyroscope has been tipped over, as shown in FIG. 2A.

FIG. 2A illustrates an example of a gyroscope 10 that has been tipped such that the flywheel 40 is spinning around a horizontal spin axis 50 in a spin direction 60. In this example, the gyroscope 10 is experiencing a gravitational force 90 that produces a torque on the gyroscope 10 in a direction that is orthogonal to its angular momentum 55, resulting in precession of the spin axis 50 around a precession axis 80 in a precession direction 70.

FIG. 2B is a simplified schematic view of the tipped gyroscope 10 of FIG. 2A as seen from above. From FIG. 2B, the torque 75 caused by the spinning of the flywheel 40 causes the angular momentum 55 of the gyroscope 10 to change direction in a sweeping pattern around the precession axis 80, which in this example passes through the center of the mount 30.

When the gyroscope is mounted such that precession is limited, this precession imposes a force onto the mount 30 that can used to stabilize a surface against rolling. FIGS. 3A and 3B illustrate an example of a gyroscope 10 mounted in a boat 5 for roll stabilization about a roll axis 95. The roll axis 95 in this example is a longitudinal axis of the boat 5.

FIG. 4 illustrates a cutaway view of the boat 5 revealing the gyroscope 10 mounted therein. As can be seen in FIG. 4, the gyroscope 10 is mounted such that the spin axis 50 is prevented from moving about the roll axis 95. When a rolling force 85 acts upon the boat 5, precession of the gyroscope 10 in a precession direction 70 about the precession axis 80 causes a stabilizing torque 75 that pulls up on one side of the mount (30a) and down on the other (30b), essentially twisting against the mount 30 in opposition to the rolling force 85. As the boat 5 rolls side-to-side, the precession of gyroscope 10 oscillates fore and aft, countering roll in respective directions along the way.

Stabilizing gyroscopes such as those described above can enhance safety and comfort for passengers of a boat, aircraft, or other vessel or platform to which the gyroscope 10 is mounted. Although such 10 gyroscopes are gaining in popularity, the technology has some significant limitations. For example, as the precession of the gyroscope 10 moves the spin axis 50 away from the vertical and towards the horizontal, the stabilizing torque 75 is directed in an increasingly horizontal plane rather than a vertical plane. When this happens, the stabilizing torque 75 increasingly induces yaw and the desired roll stabilizing properties of the gyroscope 10 increasingly diminish.

SUMMARY

Embodiments of the present disclosure are generally directed to techniques that actively control the precession of a gyroscope in order to make efficient use of the forces that gyroscope produces.

Particular embodiments include a method of controlling precession of a gyroscope that oscillates about a precession axis perpendicular to a spin axis and a roll axis of the gyroscope. The method comprises detecting a deviation of a center of the oscillation away from a nominal center. The precession is caused by roll of the gyroscope about the roll axis and imposes decreasing amounts of damping upon the roll as the precession moves away from the nominal center. The method further comprises reducing the deviation of the center of the oscillation by applying an asymmetric amount of braking to the precession when the precession and the deviation are in a same direction relative to when the precession and the deviation are in opposing directions.

In some embodiments, applying the asymmetric amount of braking comprises generating a control signal based on a target amount of damping upon the braking system and sending the control signal to a braking system controlling the braking. In some such embodiments, generating the control signal based on the target amount of damping upon the braking system comprises correcting the target amount of damping upon the braking system based on the deviation. Generating the control signal further comprises combining the corrected target amount of damping upon the braking system with damping feedback from the braking system to determine a damping error. Generating the control signal further comprises generating the control signal such that an amount of damping applied to the braking system is adjusted to correct for the damping error.

In some embodiments, applying the asymmetric amount of braking comprises generating the control signal based on a target amount of precession acceleration and sending the control signal to a braking system controlling the braking. In some such embodiments, generating the control signal based on the target amount of precession acceleration comprises correcting a target precession rate based on the deviation and determining the target amount of precession acceleration based on the corrected target precession rate. Generating the control signal further comprises combining the target amount of precession acceleration with precession feedback from a precession sensor to determine a precession acceleration error and generating the control signal such that an amount of precession acceleration permitted by the braking system is adjusted to correct for the precession acceleration error. In some such embodiments, generating the control signal based on the target amount of precession acceleration further comprises combining the corrected target precession rate with further precession feedback to determine a precession rate error. Generating the control signal further comprises determining the target amount of precession acceleration based on the corrected target precession rate comprises calculating the target amount of precession acceleration based on the precession rate error.

In some embodiments, the method further comprises calculating an amount of current that, when sent to a hydraulic damping valve of a braking system controlling the braking, reduces the deviation. The method further comprises generating a pulse width modulated (PWM) control signal having a duty cycle that provides the amount of current. Reducing the deviation by applying the asymmetric amount of braking comprises sending the PWM control signal to the hydraulic damping valve.

Other embodiments include a gyroscopic precession controller comprising processing circuitry and interface circuitry communicatively coupled to the processing circuitry. The processing circuitry is configured to detect a deviation of a center of the oscillation away from a nominal center. The precession is caused by roll of the gyroscope about the roll axis and imposes decreasing amounts of damping upon the roll as the precession moves away from the nominal center. The processing circuitry is further configured to reduce the deviation of the center of the oscillation by applying an asymmetric amount of braking to the precession when the precession and the deviation are in a same direction relative to when the precession and the deviation are in opposing directions.

In some embodiments, to apply the asymmetric amount of braking, the processing circuitry is configured to generate a control signal based on a target amount of damping upon the braking system and send the control signal to a braking system controlling the braking. In some such embodiments, to generate the control signal based on the target amount of damping upon the braking system, the processing circuitry is configured to correct the target amount of damping upon the braking system based on the deviation and combine the corrected target amount of damping upon the braking system with damping feedback from the braking system to determine a damping error. The processing circuitry is further configured to generate the control signal such that an amount of damping applied to the braking system is adjusted to correct for the damping error.

In some embodiments, to apply the asymmetric amount of braking, the processing circuitry is configured to generate a control signal based on a target amount of precession acceleration and send the control signal to a braking system controlling the braking. In some such embodiments, to generate the control signal based on the target amount of precession acceleration, the processing circuitry is configured to correct a target precession rate based on the deviation and determine the target amount of precession acceleration based on the corrected target precession rate. The processing circuitry is further configured to combine the target amount of precession acceleration with precession feedback from a precession sensor to determine a precession acceleration error and generate the control signal such that an amount of precession acceleration permitted by the braking system is adjusted to correct for the precession acceleration error. In some such embodiments, to generate the control signal based on the target amount of precession acceleration, the processing circuitry is further configured to combine the corrected target precession rate with further precession feedback to determine a precession rate error. To determine the target amount of precession acceleration based on the corrected target precession rate, the processing circuitry is configured to calculate the target amount of precession acceleration based on the precession rate error.

In some embodiments, the processing circuitry is further configured to calculate an amount of current that, when sent to a hydraulic damping valve of a braking system controlling the braking, reduces the deviation. The processing circuitry is further configured to generate a pulse width modulated (PWM) control signal having a duty cycle that provides the amount of current. To reduce the deviation by applying the asymmetric amount of braking, the processing circuitry is configured to send the PWM control signal to the hydraulic damping valve.

Yet other embodiments include an anti-roll system. The anti-roll system comprises a gyroscope and a motor configured to spin the gyroscope about a spin axis. The anti-roll system further comprises a mount configured to restrict precession of the gyroscope to oscillation about a precession axis perpendicular to the spin axis and a braking system configured to apply a braking force that controls an extent of the oscillation. The anti-roll system further comprises a gyroscopic precession controller configured to detect a deviation of a center of the oscillation away from a nominal center. The precession is caused by roll of the gyroscope about a roll axis perpendicular to the spin axis and precession axis. The precession imposes decreasing amounts of damping upon the roll as the precession moves away from the nominal center. The gyroscopic precession controller is further configured to reduce the deviation of the center of the oscillation by controlling the braking system to apply an asymmetric amount of braking to the precession when the precession and the deviation are in a same direction relative to when the precession and the deviation are in opposing directions.

In some embodiments, to apply the asymmetric amount of braking, the gyroscopic precession controller is configured to generate a control signal based on a target amount of damping upon the braking system and send the control signal to the braking system. In some such embodiments, to generate the control signal based on the target amount of damping upon the braking system, the gyroscopic precession controller is configured to correct the target amount of damping upon the braking system based on the deviation and combine the corrected target amount of damping upon the braking system with damping feedback from the braking system to determine a damping error. The gyroscopic precession controller is further configured to generate the control signal such that an amount of damping applied to the braking system is adjusted to correct for the damping error.

In some embodiments, to apply the asymmetric amount of braking, the gyroscopic precession controller is configured to generate a control signal based on a target amount of precession acceleration and send the control signal to the braking system. In some such embodiments, to generate the control signal based on the target amount of precession acceleration, the gyroscopic precession controller is configured to correct a target precession rate based on the deviation and determine the target amount of precession acceleration based on the corrected target precession rate. The gyroscopic precession controller is further configured to combine the target amount of precession acceleration with precession feedback from a precession sensor to determine a precession acceleration error and generate the control signal such that an amount of precession acceleration permitted by the braking system is adjusted to correct for the precession acceleration error. In some such embodiments, to generate the control signal based on the target amount of precession acceleration, the gyroscopic precession controller is further configured to combine the corrected target precession rate with further precession feedback to determine a precession rate error. To determine the target amount of precession acceleration based on the corrected target precession rate, the gyroscopic precession controller is configured to calculate the target amount of precession acceleration based on the precession rate error.

In some embodiments, the braking system comprises a hydraulic damping valve. The gyroscopic precession controller is further configured to calculate an amount of current that, when sent to a hydraulic damping valve of a braking system controlling the braking, reduces the deviation and generate a pulse width modulated (PWM) control signal having a duty cycle that provides the amount of current. To reduce the deviation by applying the asymmetric amount of braking, the gyroscopic precession controller is configured to send the PWM control signal to the hydraulic damping valve.

BRIEF DESCRIPTION OF THE DRAWINGS

Aspects of the present disclosure are illustrated by way of example and are not limited by the accompanying figures with like references indicating like elements. In general, the use of a reference numeral should be regarded as referring to the depicted subject matter according to one or more embodiments, whereas discussion of a specific instance of an illustrated element will append a letter designation thereto (e.g., discussion of a combiner 210, generally, as opposed to discussion of particular instances of combiners 210*a-u*).

FIG. 12 is a schematic block diagram illustrating example sensors used by a braking system controller according to one or more embodiments of the present disclosure.

FIG. 13 is a block diagram illustrating example calibration data used by a braking system controller according to one or more embodiments of the present disclosure.

FIG. 16 is a flow diagram illustrating an example method of controlling gyroscopic precession according to one or more embodiments of the present disclosure.

DETAILED DESCRIPTION

Embodiments of the present disclosure relate to controlling the precession of a gyroscope 10, e.g., to effectively combat undesired motion of a platform to which the gyroscope is mounted. Although embodiments of the present disclosure may be used in a variety of settings (e.g., aircraft, watercraft, buildings, oil platforms, spacecraft), installed in a variety of positions therein or thereon, and used to apply force in a variety of directions, for simplicity and clarity of explanation the embodiments below will be discussed in terms of a gyroscope 10 installed in the hull of a boat 5 to provide increased stabilization against roll. It should be appreciated that, in other embodiments of the present disclosure, similar principles may be applied in other settings to efficiently transfer the torque produced by the spin of a flywheel 40 within a gyroscope 10 to a platform of interest in a useful direction.

Figure 1:
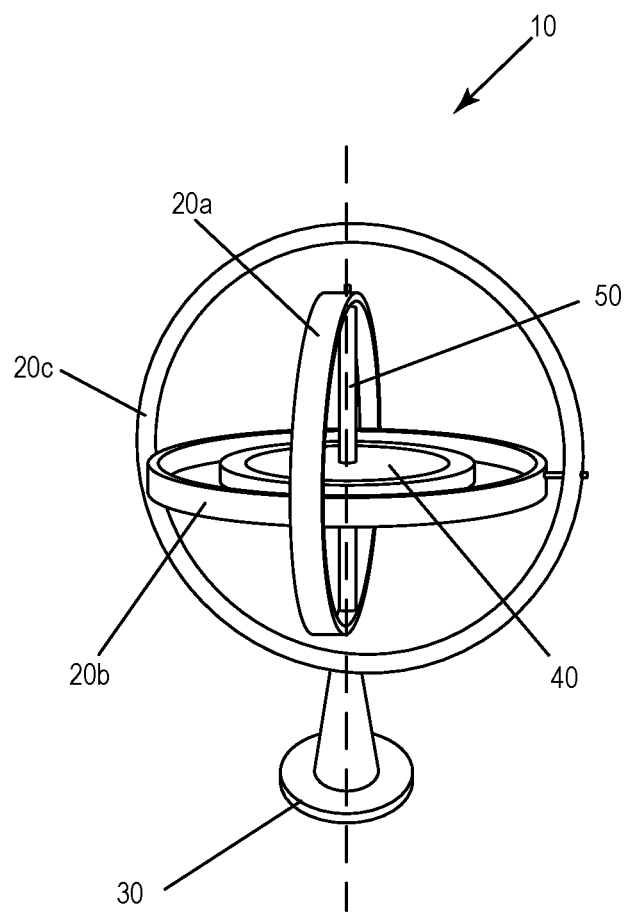
FIG. 1 is an illustration of a gyroscope spinning about a vertical spin axis according to the prior art.
Figure 2A:
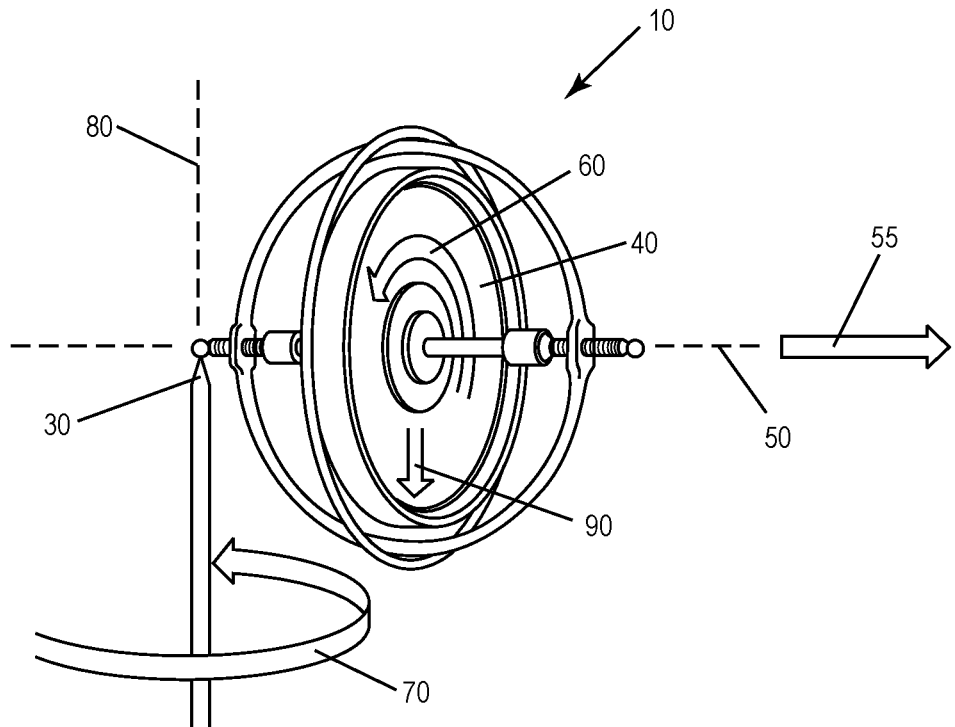
FIG. 2A is an illustration of a gyroscope spinning about a horizontal spin axis according to the prior art.
Figure 2B:
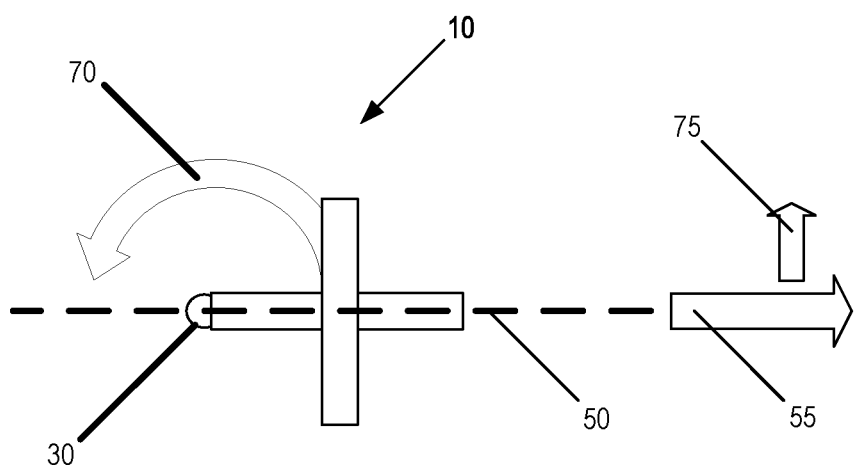
FIG. 2B is a schematic view of a gyroscope spinning about a horizontal spin axis as viewed from above according to the prior art.
Figure 3A:
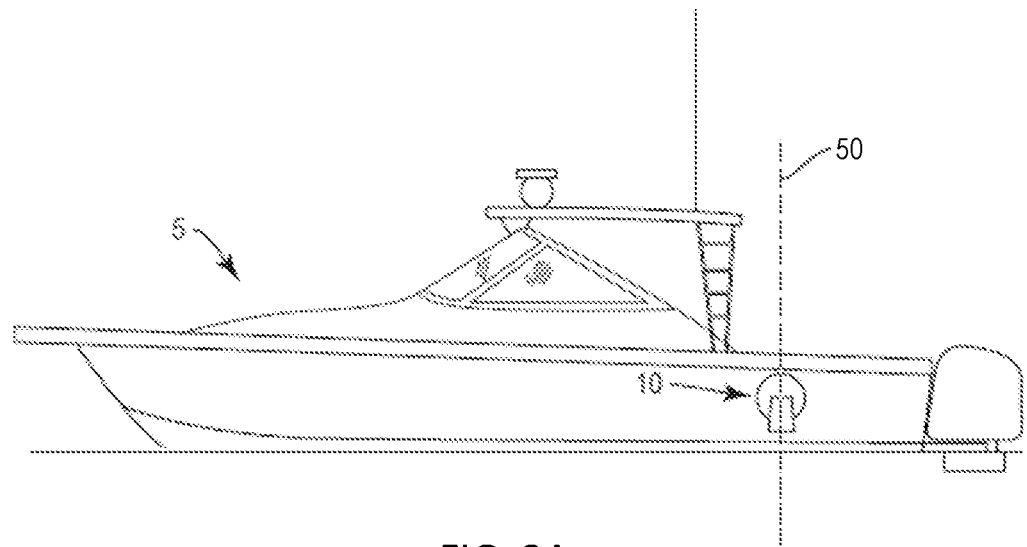
FIGS. 3A and 3B are schematic views of a gyroscope mounted to a boat according to the prior art, as viewed from the side and from above, respectively.
Figure 3B:
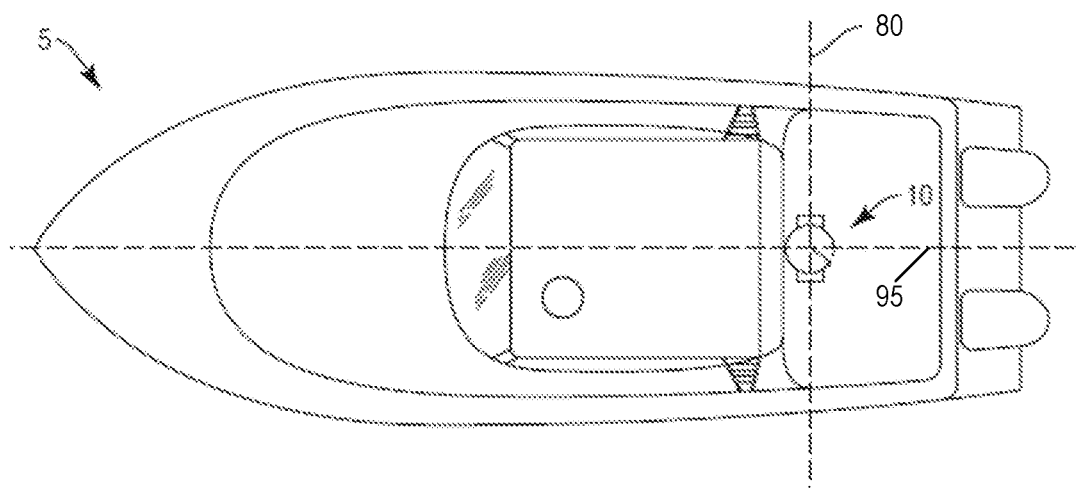
Figure 4:
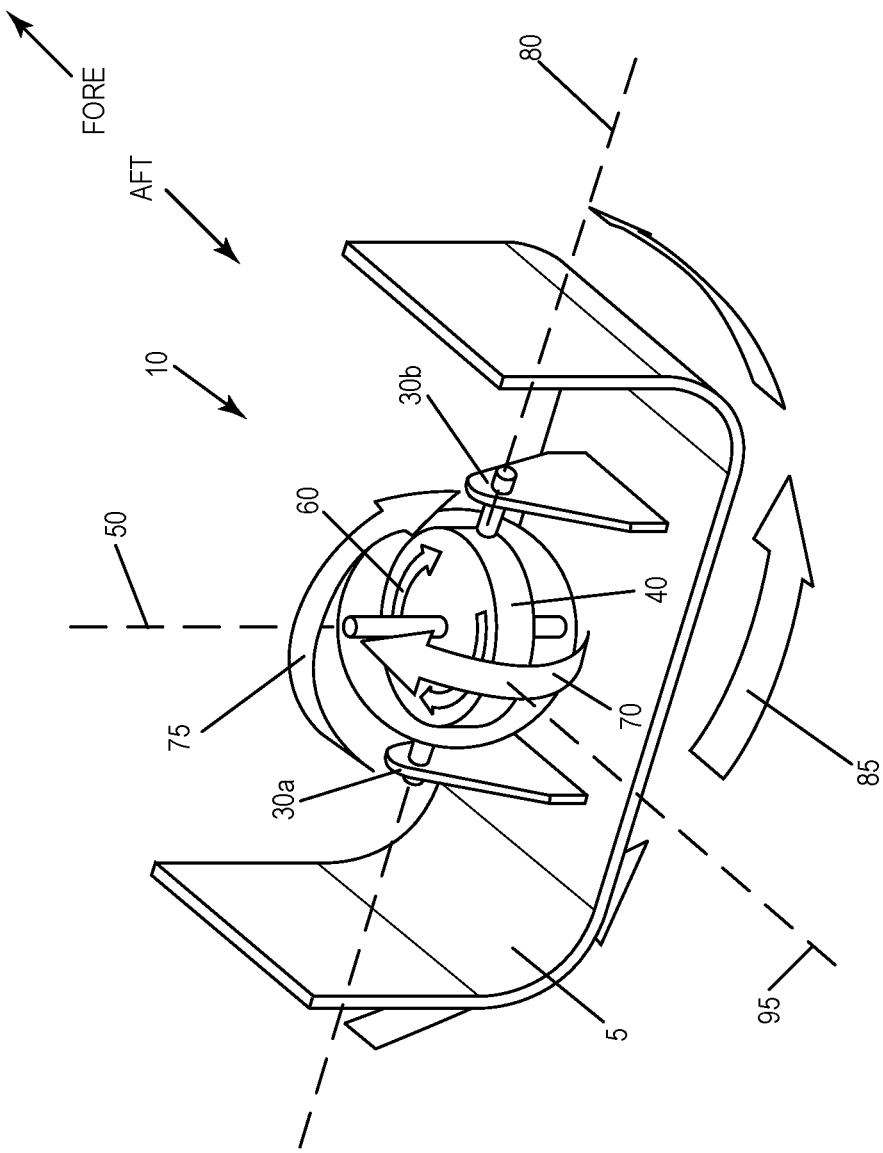
FIG. 4 is a schematic cutaway view of an example boat in which a gyroscope has been mounted according to the prior art.
Figure 5:
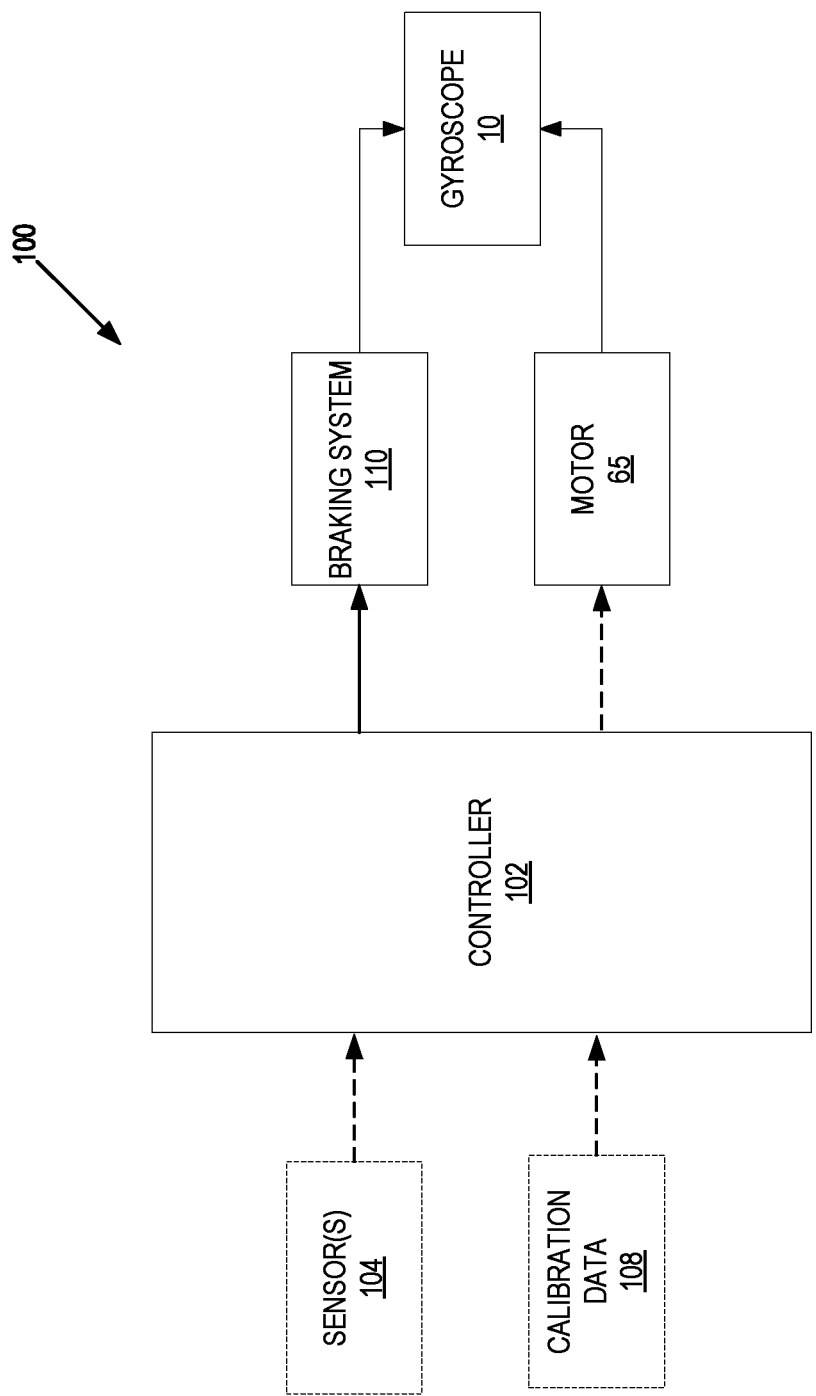
FIG. 5 is a schematic block diagram of an example anti-roll system according to one or more embodiments of the present disclosure.

FIG. 5 illustrates an example anti-roll system 100 according to one or more embodiments of the present disclosure. The anti-roll system 100 comprises a gyroscope 10, a braking system 110, a motor 65, and a controller 102. In some embodiments, the anti-roll system 100 further comprises one or more sensors 104 and/or calibration data 108 stored in non-transitory computer readable medium.

The gyroscope 10 is configured to spin about a spin axis and precess in an oscillating manner about a precession axis perpendicular to the spin axis. The motor 65 is configured to spin the gyroscope 10. The braking system 110 is configured to apply a braking force that controls an extent of the precession oscillation. The controller 102 is configured to control the amount of braking applied by the braking system 110. The sensor(s) 104 and calibration data each provide one or more inputs used by the controller 102 to determine an appropriate amount of braking to be applied by the braking system 110.

Figure 6:
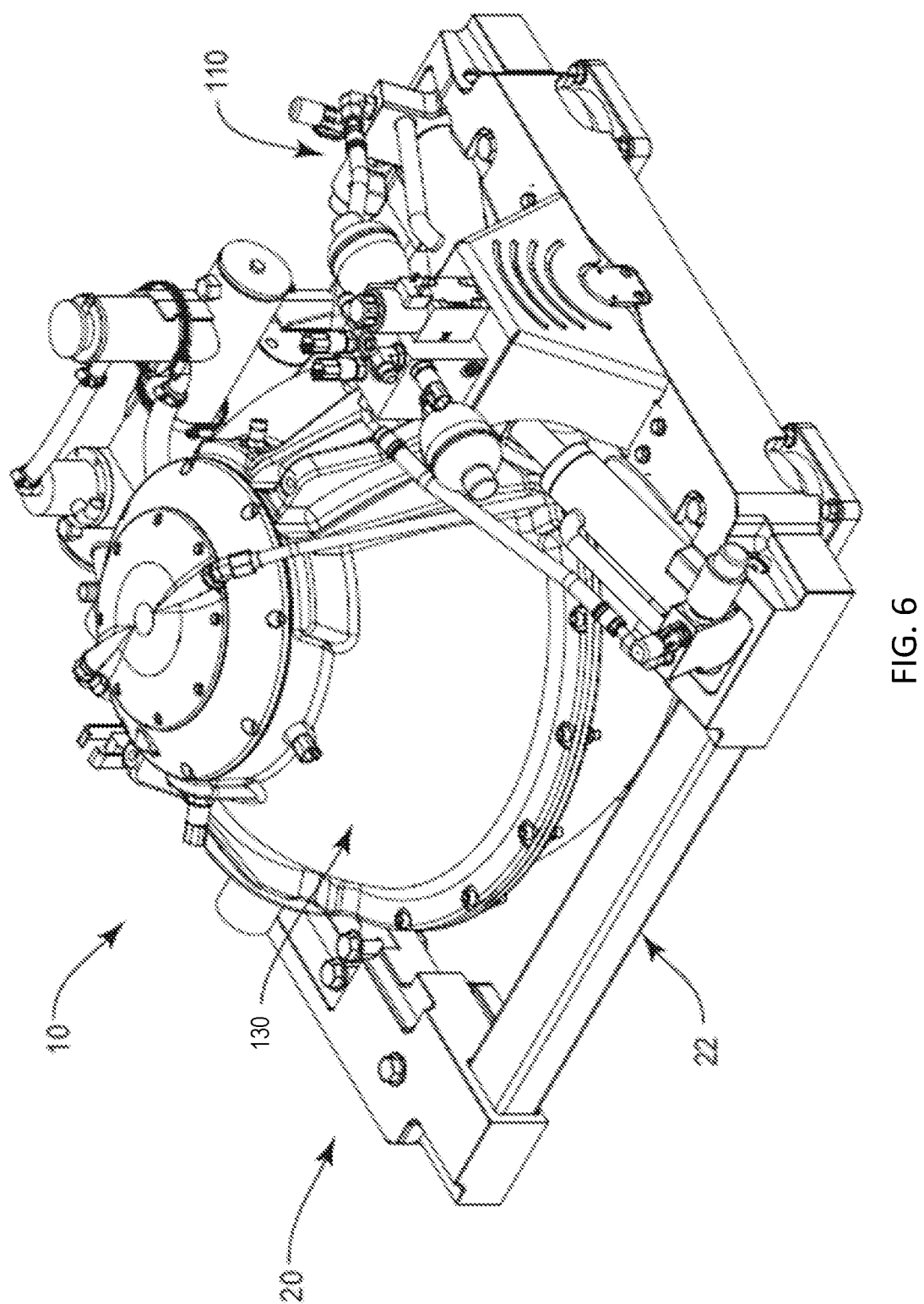
FIG. 6 is an isometric view of an example mountable gyroscope and a braking system for controlling the precession thereof according to one or more embodiments of the present disclosure.
Figure 7:
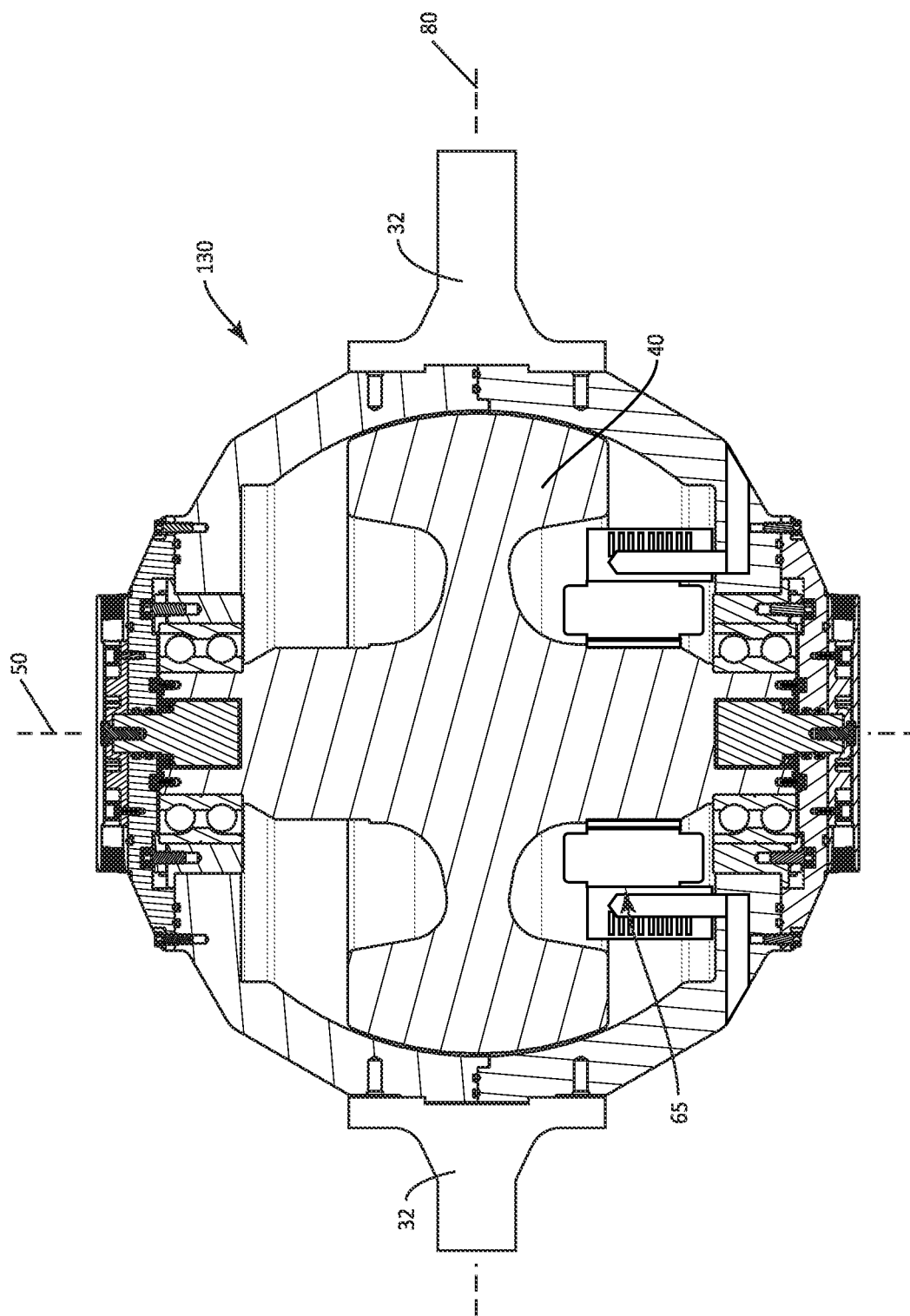
FIG. 7 is a cutaway view of an example gyroscope from the side according to one or more embodiments of the present disclosure.

FIGS. 6 and 7 illustrate a gyroscope 10 according to one or more embodiments of the present disclosure. The gyroscope 10 comprises a single-axis gimbal 20, an enclosure 130 mounted to the gimbal 20 for rotation about a precession axis 80, a flywheel 40 that is mounted inside the enclosure 30, and a motor 65 configured to rotate the flywheel 40 about a spin axis 50. As will be shown in greater detail below, precession of the gyroscope 10 is controlled by a gyroscopic precession controller so that torque from the flywheel 40 is effectively transferred to the hull of the boat 5 to counteract rolling motions.

The gimbal 20 comprises a support frame 22 that is configured to be securely mounted in the boat 5. Preferably, the gimbal 20 is mounted such that the roll axis 95 stabilized by the gyroscope 10 is aligned with a longitudinal axis of the boat 5 (i.e., fore to aft) and such that the precession axis 80 extends transversely (i.e., port to starboard). Although the gimbal 20 is conventionally mounted in the hull of the boat 5, the gimbal 20 may be mounted anywhere on the boat 5 depending on the embodiment.

The enclosure 30, in this example, is rotatably mounted to the support frame 22 by spherical roller bearings housed in pillow blocks (not shown in FIG. 7) so as to rotate about the precession axis 80 extending transversely across the boat 5. For this purpose, the enclosure 30 includes two gimbal shafts 32 projecting from diametrically opposed sides of the enclosure 30. The gimbal shafts 32 are received in the spherical bearings to allow the enclosure 30 and flywheel 40 to rotate or precess about the precession axis 80 in the fore and aft directions.

The enclosure 30 is generally spherical in form and comprises joints that are sealed to maintain a below-ambient pressure within the enclosure 30 to reduce aerodynamic drag on the flywheel 40. The flywheel 40 is connected to a shaft 44 that is mounted for rotation inside the enclosure 30 so that the spin axis 50 of the flywheel 40 is perpendicular to the precession axis 80. Thus, when the boat 5 is level, the spin axis 50 of the flywheel shaft 44 will be in the vertical direction, i.e., generally perpendicular to the deck of the boat.

The flywheel 40 and shaft 44 may be formed as a unitary piece or may comprise separate components. In one example, the diameter of the flywheel 40 is approximately 20 inches, has a weight of approximately 600 lbs., and a moment of inertia of approximately 32,000 lb in$^2$. Further, when rotated at a rate of 9000 rpm, the angular momentum of the flywheel 40 is approximately 210,000 lbm ft$^2$/s.

The motor 65 rotates the flywheel 40 at a high rate of speed (e.g., 9000 rpm) and may be mounted inside the enclosure 30 or on the exterior of the enclosure 30. In one embodiment, the motor 65 comprises operates on 230 volt single phase AC power and is able to accelerate the flywheel 40 with a moment of inertia of about 32,273 lb in2 (including the shaft 44) from rest to a rotational speed of 9000 rpm preferably in about 30 minutes or less for an average acceleration of about 5 rpm/s, and more preferably in about 20 minutes or less for an average acceleration of about 7.75 rpm/s, and even more preferably in about 10 minutes or less for an average acceleration of about 15 rpm/s (or 1.57 radians/s$^2$).

A braking system 110 (e.g., as shown in FIG. 6 and in further detail in FIG. 8) is provided to control precession of the gyroscope 10 as needed. One reason to control precession may be to constrain the precession to within a maximum operational range. Another purpose may be to guide the center of precession toward a nominal center, e.g., in order to combat drift of the gyroscope 10 over time in a particular direction and/or to improve the overall efficiency of the gyroscope in combating roll.

By imposing limitations on precession (e.g., the amount and/or rate of precession), the roll stabilizing characteristics of the gyroscope 10 may be tuned. That said, although the braking system 110 provides at least a measure of control over precession, the braking system 110 may or may not be sufficient to effectively counter the rolling motion of the boat in various circumstances, depending on one or more factors including the particular implementation of the gyroscope 10, braking system 110, the amount of roll being experienced, the physical properties of the boat 5, and so on.

In one example, the precession of the flywheel 40 is limited by the braking system 110 to within +/−22 degrees. In another example, the braking system 110 is designed to enable the flywheel 40 to precess up to about +/−45 degrees.

Figure 8:
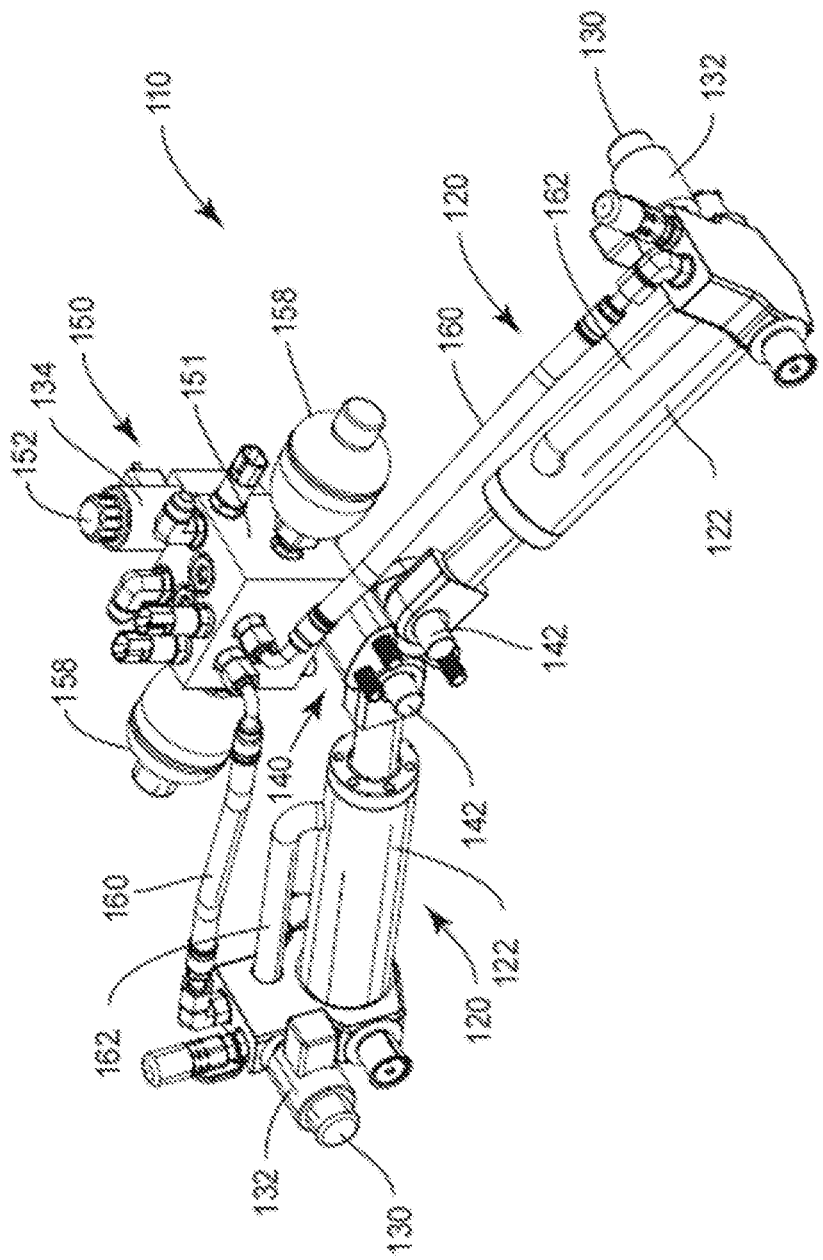
FIG. 8 is an isometric view of an example braking system according to one or more embodiments of the present disclosure.

As seen in FIG. 8, the braking system 110 comprises a pair of actuator assemblies 120 that control the precession of the flywheel 40 about the precession axis 80, and a manifold assembly 150 for transferring fluid between the opposing cylinders 120 as the flywheel 40 precesses. Hydraulic lines 160 connect the fluid cylinders 120 with the manifold assembly 150 to form a closed fluid flow path between the cylinders 120.

The actuator assemblies 120 each comprise a fluid cylinder 122 having a housing, piston, and piston rod. The fluid cylinders 122 each include a piston side port and a rod side port. A lockout valve 130 is mounted on the housing of the fluid cylinder 122 and is in fluid communication with the piston side port of each fluid cylinder 122. The lockout valve 130 is normally open and is closed by actuation of a solenoid 132. In one embodiment, the housing of the lockout valve 130 is secured to or integrally formed with the housing of the fluid cylinder 122 to form a unitary assembly. Each fluid cylinder 122 is pivotally connected at one end to the support frame 22 and at the other end to the enclosure 30. The housing of the fluid cylinder 122 pivotally connects to the support frame 22 and the piston rod pivotally connects to the enclosure 30 via a connecting plate 140.

The connecting plate 140 bolts to the exterior of the enclosure 30 and includes two pivot pins 142 that are rotatably journaled in bushings or bearings (not shown) disposed at the end of respective piston rods. The connecting plate 140 is symmetrical about a frontal plane and the pivot pins are offset from the frontal plane. As used herein, the term "frontal plane" refers to a vertical plane (when the enclosure 30 is in a neutral position) that includes the precession axis 80 and divides the enclosure 30 into front and back sections. The axes of the pivot pins 142 are parallel to the frontal plane. Bolts pass through corresponding openings in the connecting plate 140 and thread into threaded holes (not shown) in the enclosure 30 to secure the connecting pale 140 to the enclosure. Due to the mechanical arrangement of the braking system 110, the enclosure 30 is able to precess up to a mechanical limit (e.g., up to +/−45 degrees).

The manifold assembly 150 comprises a main valve 152 mounted to a manifold block 151 and controlled by a solenoid 134. Ports connect the fluid lines 160 to the normally closed lockout valves 130 in the actuator assemblies 120. Other ports connect the main valve 152 to respective accumulators 158. Fluid flowing into the main valve 152 via one of the fluid lines 160 exits into a corresponding one of the accumulators 158. Check valves control the direction of the fluid flow through the main valve 152 and prevent back flow. Additionally, pressure relief valves prevent over-pressurization of the fluid in the fluid components of the braking assembly 10 due to thermal expansion of fluid when the enclosure 30 is locked. The main valve 152 and lockout valves 130 are controlled by solenoids 132 and 134 respectively, which are actuated by a controller discussed in greater detail below.

When the enclosure 30 precesses such that the piston of one of the fluid cylinders 122 retracts, fluid flows from the piston side of the fluid cylinder 122 through the corresponding lockout valve 130. A portion of the fluid exiting the fluid cylinder 122 flows through a corresponding bypass line 162 to the rod side of the fluid cylinder 122. The rod side of the cylinder is unable to accommodate all of the fluid exiting the piston side of the cylinder due to the volume of the rod. Therefore, a portion of the fluid flows into the main valve 152. From the main valve 152, the fluid exits through a check valve that prevents backflow into the manifold 150 and through the other fluid line 160 to the other lockout valve 130 on the piston side of the other fluid cylinder 122. When the enclosure 30 precesses in the opposite direction, the fluid flow reverses.

The accumulators 158 provide additional capacity in case the fluid expands due to heat, or due to imbalance of the fluid flow. The heating or imbalance of the fluid flow will create a higher pressure in the main valve 152, which in turn will cause any excess fluid to flow into the accumulators 158.

Figure 9:
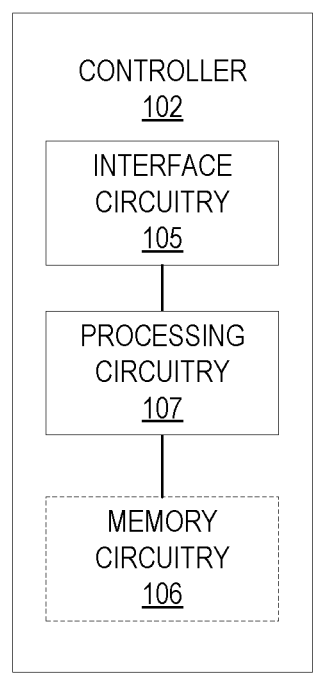
FIG. 9 is a schematic block diagram of an example gyroscopic precession controller according to one or more embodiments of the present disclosure.

The braking system 110 is controlled by a controller 102, as shown in the example of FIG. 9. The controller 102 comprises interface circuitry 105 and processing circuitry 107 that are communicatively connected to each other. The interface circuitry 105 comprises one or more signaling pathways (e.g., electrical buses, wires, lines, cables) for accepting input to be used by the processing circuitry 107 and for providing output to the braking system 110 from the processing circuitry 107. As will be shown in further detail below, the processing circuitry 107 may comprise one or more sub-controllers that receives one or more inputs and produces a control signal in response.

More specifically, the processing circuitry 107 receives an input via the interface circuitry 105 indicating a deviation in the center of oscillation of the gyroscope 10 away from a nominal center and sends a control signal to via the interface circuitry 105 to the braking system 110 to reduce the deviation. To reduce the deviation, the control signal produced by the controller 102 causes the braking system 110 to apply an asymmetric amount of braking to the precession when the precession and the deviation are in a same direction relative to when the precession and the deviation are in opposing directions.

The processing circuitry 107 may be implemented in a variety of ways, e.g., through programmable sub-controllers capable of executing control software stored in memory circuitry 106 and/or through dedicated sub-controllers. In some embodiments, the control signal generated by the controller 102 is based on input provided by one or more sensor(s) 104. In some embodiments, the controller 102 additionally or alternatively generates a further control signal for controlling the gyroscope motor 65. The control signal(s) produced by the controller 102 control precession of the flywheel 40 to counteract a rolling force imposed upon the boat 5.

In some embodiments, the controller 102 additionally or alternatively generates the control signals based on calibration data 108. This calibration data 108 may be adjusted, e.g., by providing and/or editing a configuration file stored in memory circuitry 106 of the controller 102. By adjusting this calibration data 108, the controller 102 may be tuned to accommodate a wide variety of braking systems, operating conditions, gyroscopes 10, vehicles, and/or other factors. In some embodiments, this calibration data 108 is received by the processing circuitry 107 via the interface circuitry 105. In other embodiments, the calibration data 108 is stored in the memory circuitry 106.

Figure 10:
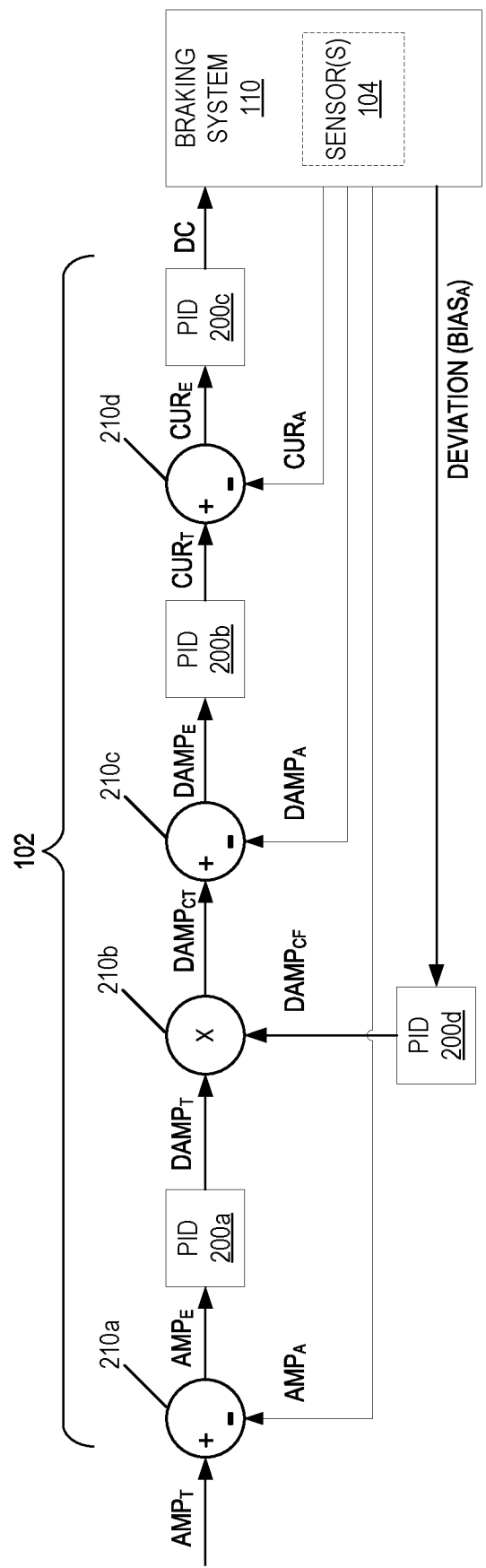
FIG. 10 is a schematic block diagram of a gyroscopic precession controller controlling a braking system according to one or more embodiments of the present disclosure.

FIG. 10 is a schematic block diagram illustrating an example controller 102 in accordance with particular embodiments of the present disclosure. As will be explained in greater detail below, the controller 102 accepts a target value representing a desired outcome with respect to the gyroscope 10. This target value is processed over a plurality of control stages in order to convert the target value into the aforesaid control signal for controlling the braking system 110. At each control stage, feedback is used to determine a respective error in the control system 100, and this error is used as an input into a sub-controller to calculate a solution that corrects the error. The feedback may be provided by one or more sensors 104 comprised in, and/or external to, the braking system 110. In the figures, subscripts are used to denote whether a given value is a target value (T), an error value (E), a corrected target value (CT), a correction factor (CF), or an actual value (A) provided, e.g., by the braking system 110 and/or from a sensor 104.

Although the examples discussed below will describe particular sub-controllers as proportional-integral-derivative controllers (PIDs) 200, it should be noted that one or more other forms of controllers may be used instead of, or together with, each of the PIDs 200 shown as appropriate, including (but not limited to) proportional (P), integral (I), derivative (D), proportional-integral (PI), and/or proportional-derivative (PD) controllers, and/or any combination thereof. In the example of FIG. 10, each PID 200 produces a corrective control output based on an input representing a form of error in the control system 100.

As shown in FIG. 10, the controller 102 receives a target precession amplitude ($AMP_T$) that represents a desired amount of gyroscopic precession for damping roll upon the boat 5. This target precession amplitude is combined with feedback indicating the actual precession amplitude ($AMP_A$) of the gyroscope 10 at combiner 210a. The difference between the target precession amplitude ($AMP_T$) and the actual precession amplitude ($AMP_A$) represents an amount of precession amplitude error ($AMP_E$) in the control system 100.

The precession amplitude error ($AMP_E$) is provided as an input to a PID 200a. The PID 200a determines a target amount of damping ($DAMP_T$) upon the braking system 110 based on the precession amplitude error ($AMP_E$). This target amount of damping ($DAMP_T$) may, for example, represent an amount of damping that a hydraulic damping valve should apply in order to accomplish the target precession amplitude ($AMP_T$).

At combiner 210b, the target amount of damping ($DAMP_T$) is combined with a damping correction factor ($DAMP_{CF}$) provided by another PID 200d to generate a corrected target amount of damping ($DAMP_{CT}$). The damping correction factor ($DAMP_{CF}$) provided by PID 200d is a value (e.g., a coefficient, a weighting factor) based on a deviation of a center of the oscillation of the precession away from a nominal center. In this example, this deviation is provided as feedback from the braking system 110 in the form of an actual precession bias ($BIAS_A$). This combination of PID 200a, 200d outputs into a corrected damping target ($DAMP_{CT}$) enables the controller 102 to target, with significant precision, a particular amount of damping that will be effective for bringing the center of precession oscillation back to the nominal center, and thereby improve anti-roll efficiency of the gyroscope 10.

At combiner 210c, the corrected target amount of damping ($DAMP_{CT}$) is combined with feedback indicating an actual amount of damping ($DAMP_A$) being applied by the braking system 110. The difference between the corrected target amount of damping ($DAMP_{CT}$) and the actual amount of damping ($DAMP_A$) represents an amount of damping error ($DAMP_E$) in the control system 100.

The damping error ($DAMP_E$) is provided as an input to PID 200b. The PID 200b determines a target amount of current ($CUR_T$) to provide to the braking system 110 (e.g., to a damping valve of the braking system 110) based on the damping error ($DAMP_E$). This target amount of current ($CUR_T$) may, for example, be an amount of current required by a hydraulic damping valve of the braking system 110 in order for the hydraulic damping valve to apply the corrected target amount of damping ($DAMP_{CT}$).

At combiner 210d, the target amount of current ($CUR_T$) is combined with feedback indicating an actual amount of current ($CUR_A$) being used by the braking system 110 (e.g., to operate the hydraulic damping value that controls braking). The difference between the target amount of current ($CUR_T$) and the actual amount of current ($CUR_A$) represents an amount of current error ($CUR_E$) in the control system 100.

The current error ($CUR_E$) is provided as an input to PID 200c. The PID 200c determines a control signal to provide to the braking system 110 (e.g., to a damping valve of the braking system 110) based on the damping error ($CUR_E$). This control signal may, for example, be a pulse width modulated (PWM) control signal having a duty cycle (DC) that provides an amount of current that corrects for the current error ($CUR_E$). In this way, a control signal is adjusted to implement a target amount of precession amplitude ($AMP_T$) by using precession deviation as a weighting factor upon the damping calculations of the controller 102.

Figure 11A:
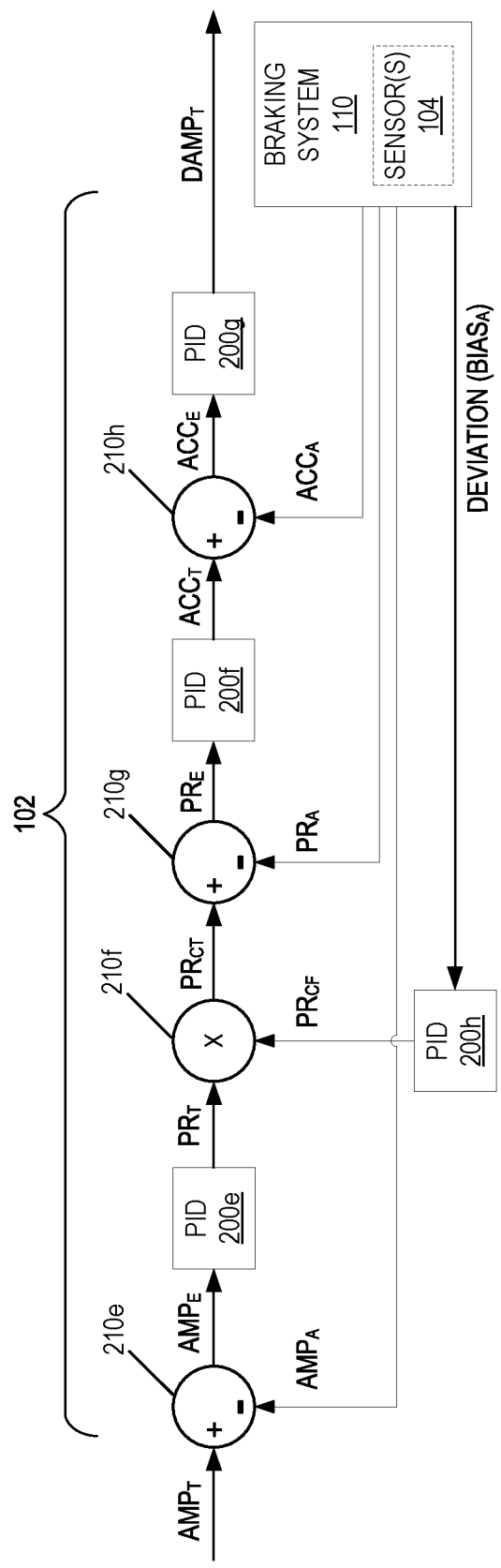
FIGS. 11A-11B are schematic block diagrams of another example gyroscopic precession controller controlling a braking system according to one or more embodiments of the present disclosure.
Figure 11B:
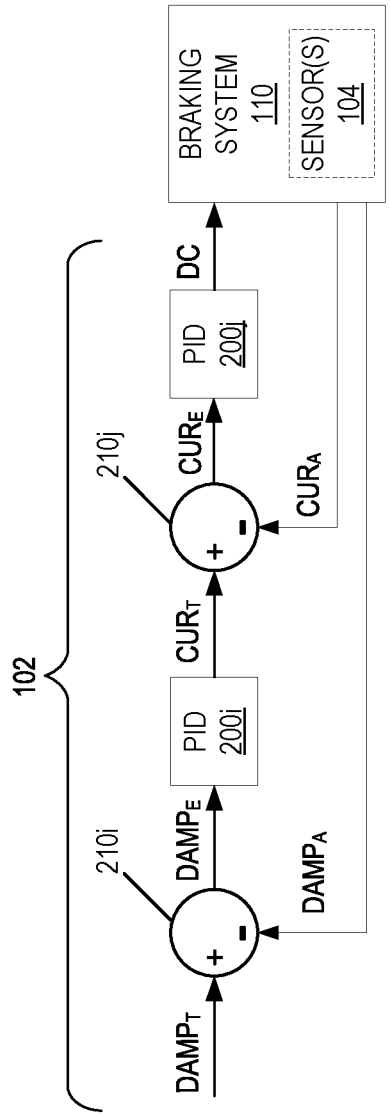

Other embodiments use other representations of the precession deviation to influence the internal calculations of the controller 102 in a way that improves precession centering in other ways. FIGS. 11A and 11B are schematic block diagrams illustrating another example controller 102 in accordance with particular embodiments of the present disclosure. In contrast to the example of FIG. 10 (which used oscillation deviation feedback to influence the controller's damping calculations), the example of FIGS. 11A and 11B uses oscillation deviation feedback to influence precession rate calculations. Thus, while the controller 102 of FIG. 10 yields improvements to the control system 100 by focusing on correcting the damping applied by a damping valve of the braking system 110, the controller 102 of FIGS. 11A and 11B yields improvements to the control system 100 by focusing on correcting the rate in which the gyroscope 10 is precessing.

Starting with reference to FIG. 11A, the controller 102 receives a target precession amplitude ($AMP_T$) that represents a desired amount of gyroscopic precession for damping roll upon the boat 5. This target precession amplitude is combined with feedback indicating the actual precession amplitude ($AMP_A$) of the gyroscope 10 at combiner 210e. The difference between the target precession amplitude ($AMP_T$) and the actual precession amplitude ($AMP_A$) represents an amount of precession amplitude error ($AMP_E$) in the control system 100.

The precession amplitude error ($AMP_E$) is provided as an input to a PID 200e. The PID 200a determines a target precession rate ($PR_T$) of the gyroscope 10 based on the precession amplitude error ($AMP_E$). This target precession rate ($PR_T$) may, for example, represent a rate of precession calculated to result in the target precession amplitude ($AMP_T$).

At combiner 210f, the target precession rate ($PR_T$) is combined with a precession rate correction factor ($PR_{CF}$) provided by another PID 200h to generate a corrected target precession rate ($PR_{CT}$). The precession rate correction factor ($PR_{CF}$) provided by PID 200h is a value (e.g., a coefficient, a weighting factor) based on a deviation of a center of the oscillation of the precession away from a nominal center. In this example, this deviation is provided as feedback from the braking system 110 in the form of an actual precession bias ($BIAS_A$). This combination of PID 200e, 200h outputs into a corrected target precession rate ($PR_{CT}$) enables the controller 102 to target, with significant precision, a particular rate of precession that will be effective for bringing the center of precession oscillation back to the nominal center, and thereby improve anti-roll efficiency of the gyroscope 10.

At combiner 210g, the corrected precession rate ($PR_{CT}$) is combined with feedback indicating an actual precession rate ($PR_A$) being permitted by the braking system 110. The difference between the corrected target precession rate ($PR_{CT}$) and the actual precession rate ($PR_A$) represents an amount of precession rate error ($PR_E$) in the control system 100.

The precession rate error ($PR_E$) is provided as an input to a PID 200f. The PID 200f determines a target acceleration rate ($ACC_T$) of the precession based on the precession rate error ($PR_E$). This target acceleration rate ($ACC_T$) may, for example, represent a rate of acceleration calculated to correct for the amount of precession rate error ($PR_E$).

At combiner 210h, the target acceleration rate ($ACC_T$) is combined with feedback indicating an actual acceleration rate ($ACC_A$) of the precession. The difference between the target acceleration rate ($ACC_T$) and the actual acceleration rate ($ACC_A$) represents an amount of acceleration rate error ($ACC_E$) in the control system 100.

The acceleration rate error ($ACC_E$) is provided as an input to a PID 200g. The PID 200g determines a target amount of damping ($DAMP_T$) upon the braking system 110 based on the acceleration rate error ($ACC_E$). This target amount of damping ($DAMP_T$) may, for example, represent an amount of damping that a hydraulic damping valve should apply in order to correct for the acceleration rate error ($ACC_E$).

Now with reference to FIG. 11B, at combiner 210i, the target amount of damping ($DAMP_T$) is combined with feedback indicating an actual amount of damping ($DAMP_A$) being applied by the braking system 110. The difference between the target amount of damping ($DAMP_T$) and the actual amount of damping ($DAMP_A$) represents an amount of damping error ($DAMP_E$) in the control system 100.

The damping error ($DAMP_E$) is provided as an input to PID 200i. The PID 200i determines a target amount of current ($CUR_T$) to provide to the braking system 110 (e.g., to a damping valve of the braking system 110) based on the damping error ($DAMP_E$). This target amount of current ($CUR_T$) may, for example, be an amount of current required by a hydraulic damping valve of the braking system 110 in order for the hydraulic damping valve to correct for the damping error ($DAMP_E$).

At combiner 210j, the target amount of current ($CUR_T$) is combined with feedback indicating an actual amount of current ($CUR_A$) being used by the braking system 110 (e.g., to operate the hydraulic damping value that controls braking). The difference between the target amount of current ($CUR_T$) and the actual amount of current ($CUR_A$) represents an amount of current error ($CUR_E$) in the control system 100.

The current error ($CUR_E$) is provided as an input to PID 200j. The PID 200j determines a control signal to provide to the braking system 110 (e.g., to a damping valve of the braking system 110) based on the current error ($CUR_E$). This control signal may, for example, be a PWM control signal having a duty cycle (DC) that provides an amount of current that corrects for the current error ($CUR_E$). In this way, a control signal is adjusted to implement a target amount of precession amplitude ($AMP_T$) by using precession deviation as a weighting factor upon the precession rate calculations of the controller 102.

Although FIGS. 10 and 11A-B provide relatively simple examples for purposes of explanation, other embodiments of the present disclosure include a controller 102 that considers one or more additional or alternative factors in its calculations. For example, while each of the examples of FIGS. 10 and 11A-B resulted in the calculation of a PWM control signal having a particular duty cycle, the PID 200c, 200j responsible for generating that control signal may take into account the oil temperature in the braking system 110. Given that colder oil is typically more viscous and therefore offers greater resistance in flowing through the hydraulic damping valve, the PID 200c, 200j responsible for generating the control signal may provide a control signal having a duty cycle that supplies more or less current based on the oil temperature. Thus, generally speaking, a PID 200 may be configured to adjust its calculations in response to feedback from the braking system 110 and/or readings from one or more sensors 104.

FIG. 12 is a schematic block diagram illustrating a non-limiting example of sensors 104 that may provide inputs to the controller 102 for use in performing one or more calculations according to particular embodiments of the present disclosure. In the example of FIG. 12, the sensors 104 comprise an oil temperature sensor 301, an oil pressure sensor 302, a roll sensor 303, a flywheel angular velocity sensor 304, a gyro precession angle sensor 305, and/or a current sensor 306, each of which may provide a sensor output to one or more of the subcontrollers (e.g., PIDs 200) of the controller 102.

The controller 102 may additionally or alternatively make adjustments based on certain calibration data 108. This calibration data 108 may be stored in a centralized memory or programmed into the subcontrollers themselves, for example. FIG. 13 is a schematic block diagram illustrating a non-limiting example of certain configuration data 108 according to one or more embodiments of the present disclosure. In the example of FIG. 13, the calibration data 108 comprises a precession angle threshold ($PA_{TH}$) 311, a precession damping increment gain ($GAIN_{D+}$) 312, a precession damping decrement gain ($GAIN_{D-}$) 313, one or more hydraulic system dimensions (DIM) 314, a damping correction PID gain ($GAIN_{COR}$) 315, precession centering gain ($GAIN_C$) 316, a flywheel mass moment of intertia (MOI) 317, a precession control PID gain ($GAIN_{PCON}$) 318, one or more gyro mass properties (MASS) 319, an anti-roll torque increment gain ($GAIN_{AR+}$) 321 and/or an ant-roll torque decrement gain 322 ($GAINAR_-$).

Figure 14A:
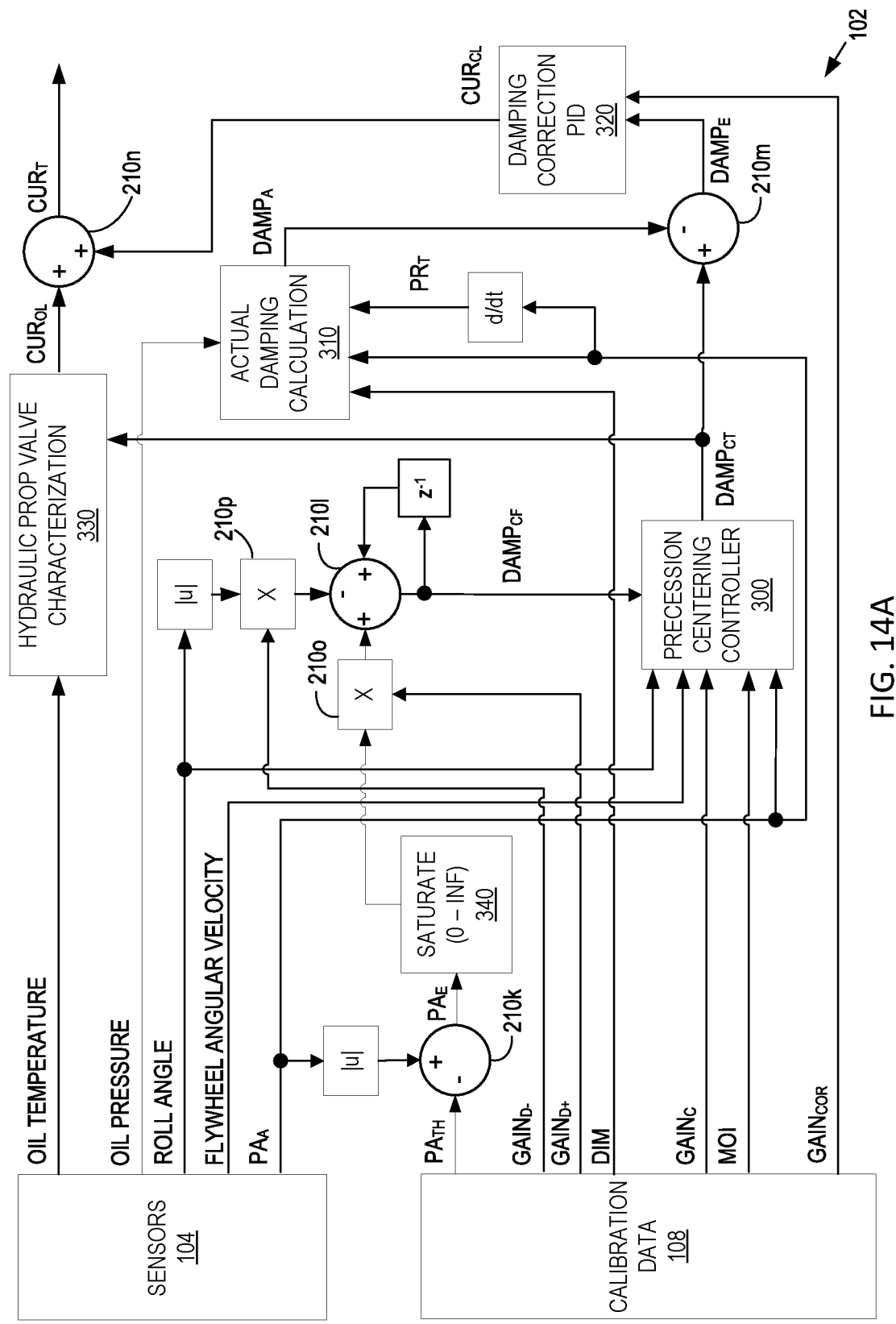
FIGS. 14A and 14B is a schematic block diagram illustrating a further example of a gyroscopic precession controller controlling a braking system according to one or more embodiments of the present disclosure.
Figure 14B:
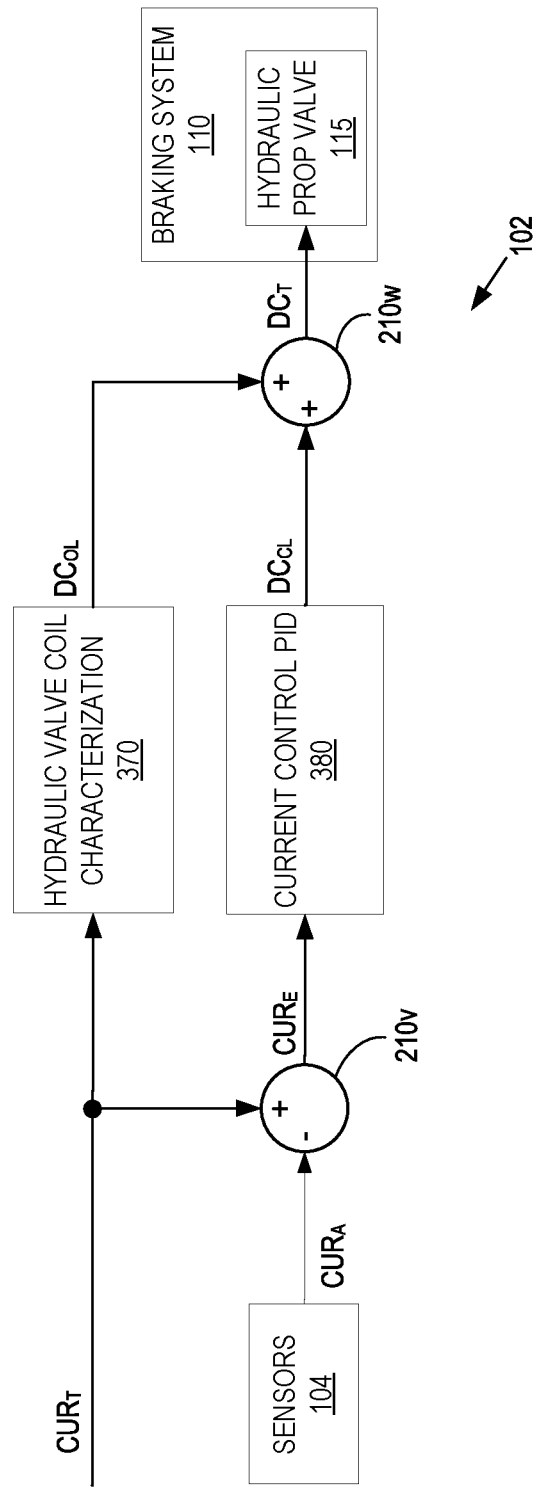

FIGS. 14A and 14B are schematic block diagrams illustrating an example controller 102 that uses sensors 104 and calibration data 108 as inputs in order to generate a control signal for controlling a hydraulic proportioning valve 115 of a braking system 110 according to one or more embodiments of the present disclosure. Similar to the example of FIG. 10, the controller 102 in FIG. 14 combines sub-controller outputs to apply a damping correction factor ($DAMP_{CF}$) to obtain a corrected target amount of damping ($DAMP_{CT}$).

Beginning with reference to FIG. 14A, the actual precession angle of the gyroscope ($PA_A$) is provided by the sensors 104 and a precession angle threshold ($PA_{TH}$) is provided by the calibration data 108. The magnitude of the actual precession angle ($PA_A$) is combined with the precession angle threshold ($PA_{TH}$) at combiner 210k to provide a precession angle error ($PA_E$). If the value of the precession angle error ($PA_E$) is out of a given range (in this example, zero to infinity), the precession angle error is clamped to the closest value that is in range at saturation stage 340.

At combiner 210o, the clamped precession angle error ($PA_E$) is combined with a precession damping increment gain ($GAIN_{D+}$) provided by the calibration data 108 which acts as a weighting factor. The result of the combiner 210o is used at combiner 2101 as one of a plurality of inputs toward calculating a hydraulic damping correction factor ($DAMP_{CF}$).

Another of the inputs to the combiner 2101 is the magnitude of roll angle experienced by the vessel as weighted by a precession damping decrement gain ($GAIN_{D-}$) at combiner 210p, with the roll angle being provided by the sensors 104 and the precession damping decrement gain ($GAIN_{D-}$) being provided by the calibration data 108. Thus, at combiner 2101, a factor indicating that damping upon the precession should increase competes against a factor indicating that damping upon the precession should decrease so that an appropriate hydraulic valve damping correction factor ($DAMP_{CF}$) may be calculated. More specifically, the difference between these two competing factors is fed back into the combiner 2101 as a denominator so that the ratio of future calculations at combiner 2101 may be compared against previous ones to determine a dynamic ratio. This ratio serves as the damping correction factor ($DAMP_{CF}$), which is provided to a precession centering controller 300 in order to calculate a corrected target amount of damping ($DAMP_{CT}$) that should be applied by a hydraulic proportioning value 210 of the braking system 110 to control precession of the gyroscope 10.

The precession centering controller 300 uses a variety of inputs in order to determine the corrected target damping target ($DAMP_{CT}$). These inputs include the roll angle, the gyro procession angle ($PA_A$), and the flywheel angular velocity provided by the sensors 104 as well as a precession centering gain ($GAIN_C$) and a flywheel mass moment of intertia (MOI) provided by the calibration data 108, in addition to the damping correction factor ($DAMP_{CF}$) previously mentioned.

As will be shown in greater detail below, the corrected target amount of damping ($DAMP_{CT}$) will be used as a basis for determining an open loop current component ($CUR_{OL}$) and as a basis for determining a closed loop current component ($CUR_{CL}$). These two current components are combined at combiner 210n to determine a target amount of current ($CUR_T$) for controlling the hydraulic proportioning valve 115 of the braking system 110. For example, these the current components may be a respective number of amps that, when added together, specify a total amount of current to provide to the hydraulic proportioning valve 115 in order for the braking system 110 to provide braking that corrects precession deviation. Accordingly, the PWM control signal provided to the hydraulic proportioning valve may have a duty cycle intended to provide the target amount of current ($CUR_T$).

Hydraulic value proportioning valve characterization 330 is performed using the corrected target amount of damping ($DAMP_{CT}$) and the temperature of the oil flowing through the hydraulic proportioning valve 115 to determine the open loop current component ($CUR_{OL}$). That is, the oil temperature provided by the sensors 104 is used along with the corrected target amount of damping ($DAMP_{CT}$) to model the characteristics of the hydraulic proportioning valve 115 in order to calculate the open loop current component ($CUR_{OL}$).

The corrected target amount of damping ($DAMP_{CT}$) is also used at combiner 210m where it is compared against an actual amount of damping ($DAMP_A$) to determine a damping error ($DAMP_E$). This damping error ($DAMP_E$) is used by a damping correction PID 320 along with a damping correction PID gain ($GAIN_{COR}$) to determine the closed loop current component ($CUR_{CL}$).

The actual amount of damping ($DAMP_A$) is provided to the combiner 210m by an actual damping calculation 310. The actual damping calculation 310 calculates the actual amount of damping ($DAMP_A$) based on the oil pressure and actual precession angle ($PA_A$) provided by the sensors 104, one or more dimensions (DIM) of the hydraulic braking system 110 provided by the calibration data 108, and a target precession rate ($PR_T$) determined from observance of the actual precession angle ($PA_A$) over time to obtain an instantaneous rate of change.

Turning to FIG. 14B, the target amount of current ($CUR_T$) is used to obtain a closed loop duty cycle component ($DC_{OL}$) and a closed loop duty cycle component ($DC_{CL}$). Each of these duty cycle components may, for example, represent a portion of a target duty cycle ($DC_T$) of the PWM control signal that will control the hydraulic proportioning valve 115.

To determine the open loop duty cycle component ($DC_{OL}$), an hydraulic valve coil characterization 370 is performed based on the target amount of current ($CUR_T$). For example, the controller 102 may model one or more power attributes of the braking system 110 to determine an appropriate portion of the PWM control signal duty cycle that accounts for how the braking system 110 behaves electrically.

To determine the closed loop duty cycle component ($DC_{CL}$), the target amount of current is combined with an actual amount of current ($CUR_A$) provided by the sensors 104 at combiner 210v to obtain an amount of current error ($CUR_E$). Based on this current error ($CUR_E$), a current control PID 380 determines the closed loop duty cycle component ($DC_{CL}$). This closed loop duty cycle component (DCCL) may, for example, represent an appropriate adjustment to the PWM control signal duty cycle in view of actual current feedback from the sensors 104.

The open loop duty cycle component (DCOL) and the closed loop duty cycle component (DCCL) are combined at combiner 210w to generate the PWM control signal having a target duty cycle ($DC_T$). Thus, the controller 102 of FIGS. 14A and 14B illustrates an example in which different factors and sub-controllers are used to determine open loop and closed loop factors that form a basis for generating an appropriate PWM control signal for controlling the hydraulic proportioning valve 115 of the braking system 110.

Figure 15:
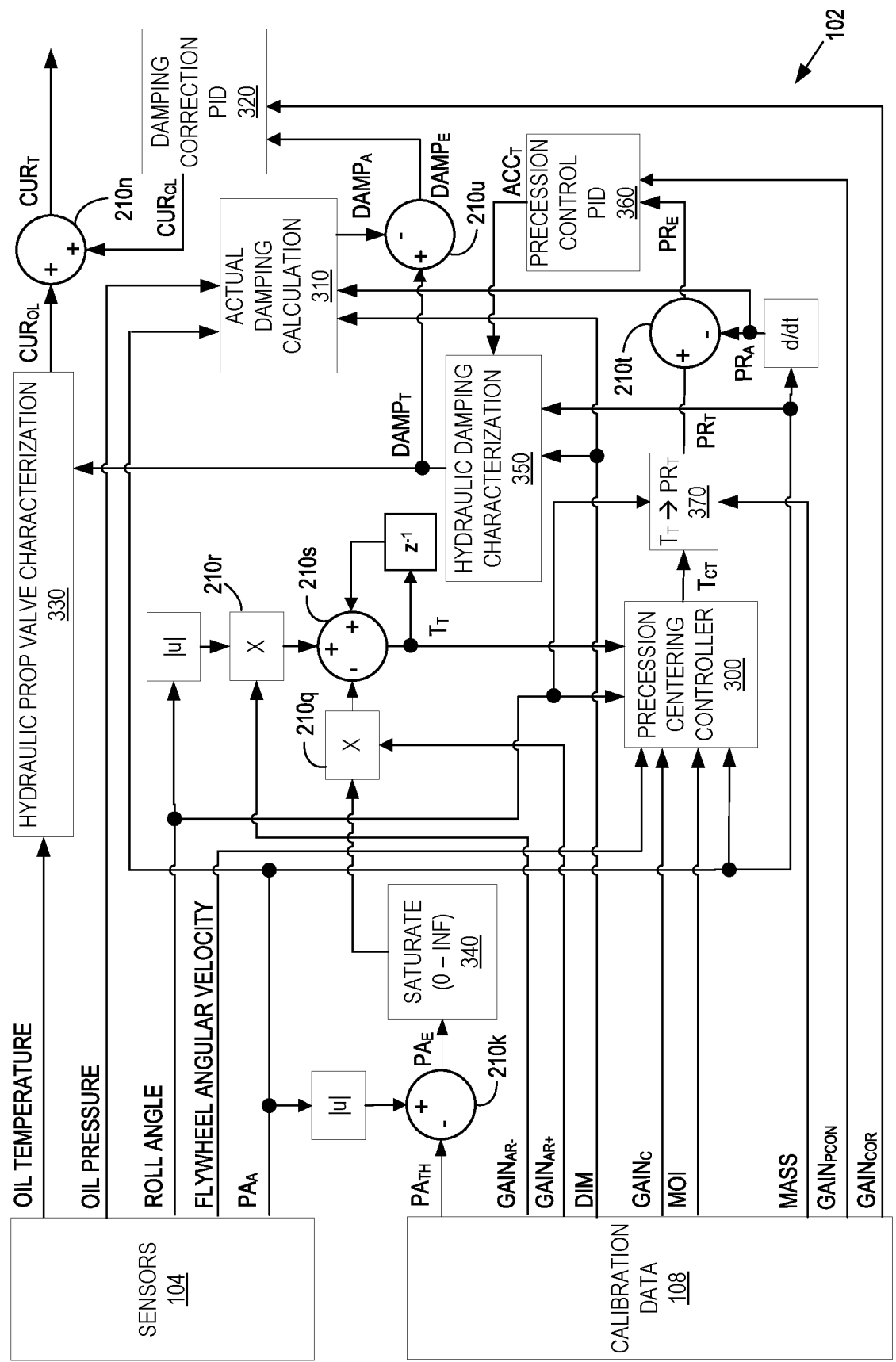
FIG. 15 is a schematic block diagram illustrating a yet further example of a gyroscopic precession controller controlling a braking system according to one or more embodiments of the present disclosure.

Another example of a controller 102 is illustrated in the schematic block diagram of FIG. 15. Similar to the example provided in FIGS. 14A and 14B, the controller 102 of FIG. 15 uses sensors 104 and calibration data 108 as inputs in order to generate a control signal for a hydraulic proportioning valve 115 of a braking system 110 according to particular embodiments of the present disclosure.

In the example of FIG. 15, the actual precession angle of the gyroscope ($PA_A$) is provided by the sensors 104 and a precession angle threshold ($PA_{TH}$) is provided by the calibration data 108. The magnitude of the actual precession angle ($PA_A$) is combined with the precession angle threshold ($PA_{TH}$) at combiner 210k to provide a precession angle error ($PA_E$). If the value of the precession angle error ($PA_E$) is out of a given range (in this example, zero to infinity), the precession angle error is clamped to the closest value that is in range at saturation stage 340.

At combiner 210q, the clamped precession angle error ($PA_E$) is combined with an anti-roll torque increment gain ($GAIN_{D+}$) provided by the calibration data 108 which acts as a weighting factor. The result of the combiner 210q is used at combiner 210s as one of a plurality of inputs toward calculating a target anti-roll torque ($T_T$).

Another of the inputs to the combiner 210s is the magnitude of roll angle of the vessel as weighted by an anti-roll torque decrement gain ($GAIN_{D-}$) by combiner 210r. The roll angle is provided by the sensors 104 and the precession damping decrement gain ($GAIN_{D-}$) is provided by the calibration data 108. Thus, at combiner 210s, a factor indicating that damping upon the precession should increase competes against a factor indicating that damping upon the precession should decrease so that an appropriate target anti-roll torque ($T_T$) may be calculated. More specifically, the difference between these two competing factors is fed back into the combiner 210s as a denominator so that the ratio of future calculations at combiner 210s may be compared against previous ones to determine a dynamic ratio. This ratio serves as a target anti-roll torque ($T_T$) factor, which is provided to a precession centering controller 300 in order to calculate a corrected target anti-roll torque ($T_{CT}$) desired from the braking system 110 in order to reduce roll.

The precession centering controller 300 uses a variety of inputs in order to determine the corrected target anti-roll torque ($T_{CT}$). These inputs include the roll angle, the gyro precession angle ($PA_A$), and the flywheel angular velocity provided by the sensors 104 as well as a precession centering gain ($GAIN_C$), and a flywheel mass moment of intertia (MOI) provided by the calibration data 108, in addition to the target anti-roll torque ($T_T$) previously mentioned.

A transformation calculation is performed to convert the corrected target anti-roll torque ($T_{CT}$) into a target precession rate ($PR_T$) at a torque-to-precession rate transformation stage 370. In support of this transformation, the transformation stage uses the roll angle provided by the sensors 104 and one or more gyro mass properties (MASS) provided by the calibration data 108.

The target precession rate ($PR_T$) is compared against an actual precession rate ($PR_A$) at combiner 210t to determine a precession rate error ($PR_E$). The actual precession rate ($PR_A$) is obtained by observing the actual precession angle ($PA_A$) provided by the sensors 104 over time to determine an instantaneous rate of change.

The precession rate error ($PR_E$) is used by a precession control PID 360 along with a precession control PID gain (GAIN$_{PCON}$) provided by the calibration data to determine a target angular acceleration (ACC$_T$) of the gyroscope 10.

The target angular acceleration (ACC$_T$) is used along with the actual precession angle (PA$_A$) provided by the sensors 104 and one or more dimensions (DIM) of the braking system 110 to characterize a target amount of hydraulic damping (DAMP$_T$) to apply at damping characterization stage 350. As will be explained more fully below, the target amount of damping (DAMP$_T$) will be used as a basis for determining an open loop current component (CUR$_{OL}$) and as a basis for determining a closed loop current component (CUR$_{CL}$) of a target current (CUR$_T$) for controlling the braking system 110.

Hydraulic value proportioning valve characterization 330 is performed using the target amount of damping (DAMP$_T$) and the temperature of the oil flowing through the hydraulic proportioning valve 115 to determine the open loop current component (CUR$_{OL}$). More specifically, an oil temperature provided by the sensors 104 is used along with the target amount of damping (DAMP$_T$) to model the characteristics of the hydraulic proportioning value 210 in furtherance of subsequently generating the PWM control signal output by the controller 102 to the braking system 110.

The target amount of damping (DAMP$_T$) is also used at combiner 210$u$ where it is compared against an actual amount of damping (DAMP$_A$) to determine a damping error (DAMP$_E$). This damping error (DAMP$_E$) is used by a damping correction PID 320 along with a damping correction PID gain (GAIN$_{COR}$) to determine the closed loop current component (CUR$_{CL}$).

The actual amount of damping (DAMP$_A$) is provided to the combiner 210$u$ by an actual damping calculation 310. The actual damping calculation 310 calculates the actual amount of damping (DAMP$_A$) based on the oil pressure and actual precession angle (PA$_A$) provided by the sensors 104, one or more dimensions (DIM) of the hydraulic braking system 110 provided by the calibration data 108, and the actual precession rate (PR$_A$) previously discussed.

The open loop and closed loop current components (CUR$_{OL}$, CUR$_{CL}$) are combined by combiner 210$n$ to produce a target amount of current (CUR$_T$) for controlling the hydraulic proportioning valve 115 of the braking system 110. Similar to the example illustrated in FIG. 14B, the target amount of current (CUR$_T$) determined in FIG. 15 may be used to determine open and closed loop duty cycle components (DC$_{OL}$, DC$_{CL}$) that will be combined to determine a target duty cycle (DC$_T$) of the PWM control signal that will control the hydraulic proportioning valve 115 of the braking system 110. Thus, the controller 102 of FIG. 15 illustrates another example in which different factors and sub-controllers are used to determine open loop and closed loop factors forming bases for generating an appropriate PWM control signal.

In view of the numerous examples described above, FIG. 16 is a flow diagram illustrating an example method 400 of controlling precession of a gyroscope 10 that oscillates about a precession axis 80 perpendicular to a spin axis 50 and a roll axis 95 of the gyroscope 10. The method 400 comprises detecting a deviation of a center of the oscillation away from a nominal center (block 410). The precession is caused by roll of the gyroscope about the roll axis and imposes decreasing amounts of damping upon the roll as the precession moves away from the nominal center. The method 400 further comprises reducing the deviation of the center of the oscillation by applying an asymmetric amount of braking to the precession when the precession and the deviation are in a same direction relative to when the precession and the deviation are in opposing directions (block 420).

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of controlling precession of a gyroscope that oscillates about a precession axis perpendicular to a spin axis and a roll axis of the gyroscope, the method implemented by a gyroscopic precession controller and comprising:
    detecting a deviation of a center of the oscillation of the gyroscope away from a nominal center, wherein the precession:
        is caused by roll of the gyroscope about the roll axis; and
        imposes decreasing amounts of damping upon the roll as the precession moves away from the nominal center; and
    sending, to a gyroscopic precession braking system, an electronic braking control signal configured to reduce the deviation of the center of the oscillation by applying an asymmetric amount of braking to the precession when the precession and the deviation are in a same direction relative to when the precession and the deviation are in opposing directions.

2. The method of claim 1, further comprising generating the electronic braking control signal based on a target amount of damping upon the gyroscopic precession braking system.

3. The method of claim 2, wherein generating the electronic braking control signal based on the target amount of damping upon the gyroscopic precession braking system comprises:
    correcting the target amount of damping upon the gyroscopic precession braking system based on the deviation;
    combining the corrected target amount of damping upon the gyroscopic precession braking system with damping feedback from the gyroscopic precession braking system to determine a damping error; and
    generating the electronic braking control signal such that an amount of damping applied to the gyroscopic precession braking system is adjusted to correct for the damping error.

4. The method of claim 1, further comprising generating the electronic braking control signal based on a target amount of precession acceleration.

5. The method of claim 4, wherein generating the electronic braking control signal based on the target amount of precession acceleration comprises:
    correcting a target precession rate based on the deviation;
    determining the target amount of precession acceleration based on the corrected target precession rate;
    combining the target amount of precession acceleration with precession feedback from a precession sensor to determine a precession acceleration error; and
    generating the electronic braking control signal such that an amount of precession acceleration permitted by the gyroscopic precession braking system is adjusted to correct for the precession acceleration error.

6. The method of claim 5, wherein:
generating the electronic braking control signal based on the target amount of precession acceleration further comprises combining the corrected target precession rate with further precession feedback to determine a precession rate error;
determining the target amount of precession acceleration based on the corrected target precession rate comprises calculating the target amount of precession acceleration based on the precession rate error.

7. The method of claim 1, further comprising:
calculating an amount of current that, when sent to a hydraulic damping valve of the gyroscopic precession braking system, reduces the deviation; and
generating the electronic braking control signal, the electronic braking control signal comprising a pulse width modulated (PWM) control signal having a duty cycle that provides the amount of current;
wherein sending the electronic braking control signal to reduce the deviation by applying the asymmetric amount of braking comprises sending the PWM control signal to the hydraulic damping valve.

8. A gyroscopic precession controller for controlling precession of a gyroscope that oscillates about a precession axis perpendicular to a spin axis and a roll axis of the gyroscope, the gyroscopic precession controller comprising:
processing circuitry and interface circuitry communicatively coupled to the processing circuitry, wherein the processing circuitry is configured to:
detect a deviation of a center of the oscillation of the gyroscope away from a nominal center, wherein the precession:
is caused by roll of the gyroscope about the roll axis; and
imposes decreasing amounts of damping upon the roll as the precession moves away from the nominal center; and
send, to a gyroscopic precession braking system via the interface circuitry, an electronic braking control signal configured to reduce the deviation of the center of the oscillation by applying an asymmetric amount of braking to the precession when the precession and the deviation are in a same direction relative to when the precession and the deviation are in opposing directions.

9. The gyroscopic precession controller of claim 8, wherein the processing circuitry is further configured to generate the electronic braking control signal based on a target amount of damping upon the gyroscopic precession braking system.

10. The gyroscopic precession controller of claim 9, wherein to generate the control signal based on the target amount of damping upon the braking system, the processing circuitry is configured to:
correct the target amount of damping upon the gyroscopic precession braking system based on the deviation;
combine the corrected target amount of damping upon the gyroscopic precession braking system with damping feedback from the gyroscopic precession braking system to determine a damping error; and
generate the electronic braking control signal such that an amount of damping applied to the gyroscopic precession braking system is adjusted to correct for the damping error.

11. The gyroscopic precession controller of claim 8, wherein the processing circuitry is further configured to generate the electronic braking control signal based on a target amount of precession acceleration.

12. The gyroscopic precession controller of claim 11, wherein to generate the control signal based on the target amount of precession acceleration, the processing circuitry is configured to:
correct a target precession rate based on the deviation;
determine the target amount of precession acceleration based on the corrected target precession rate;
combine the target amount of precession acceleration with precession feedback from a precession sensor to determine a precession acceleration error; and
generate the electronic braking control signal such that an amount of precession acceleration permitted by the gyroscopic precession braking system is adjusted to correct for the precession acceleration error.

13. The gyroscopic precession controller of claim 12, wherein:
to generate the electronic braking control signal based on the target amount of precession acceleration, the processing circuitry is further configured to combine the corrected target precession rate with further precession feedback to determine a precession rate error;
to determine the target amount of precession acceleration based on the corrected target precession rate, the processing circuitry is configured to calculate the target amount of precession acceleration based on the precession rate error.

14. The gyroscopic precession controller of claim 8, wherein the processing circuitry is further configured to:
calculate an amount of current that, when sent to a hydraulic damping valve of the gyroscopic precession braking system, reduces the deviation; and
generate the electronic braking control signal, the electronic braking control signal comprising a pulse width modulated (PWM) control signal having a duty cycle that provides the amount of current;
wherein to send the electronic braking control signal to reduce the deviation by applying the asymmetric amount of braking, the processing circuitry is configured to send the PWM control signal to the hydraulic damping valve.

* * * * *